Figure 1:
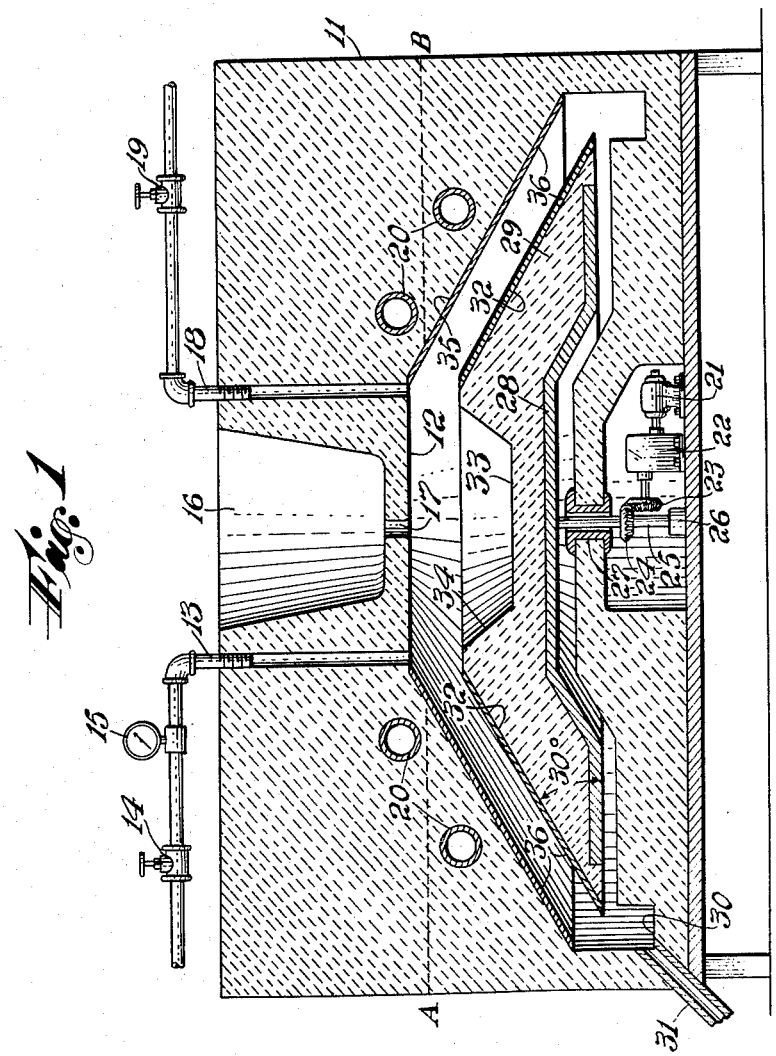

Nov. 1, 1960  F. FESSLER  2,958,570
METHODS FOR STERILIZATION OF MATERIALS
Filed July 31, 1957  2 Sheets-Sheet 2

INVENTOR.
Frank Fessler
BY Norman N. Popper
ATTORNEY

United States Patent Office 2,958,570
Patented Nov. 1, 1960

2,958,570

METHOD FOR STERILIZATION OF MATERIALS

Frank Fessler, 751 High St., Newark, N.J., assignor of ten percent to James J. Gustat, East Orange, N.J., ten percent to Edwin W. Phillips, Millburn, N.J., ten percent to Patrick F. McDevitt, Jersey City, N.J., ten percent to Charles W. Hutchinson, Chatham, N.J., five percent to Arthur J. Blake, Jersey City, N.J., and fifteen percent to Raymond J. Lamb, Ridgewood, NJ.

Filed July 31, 1957, Ser. No. 675,440

17 Claims. (Cl. 21—2)

This application is a continuation in part of my pending patent applications:

| Serial # | Filed | For— |
|---|---|---|
| 584,562 | 5/14/56 | Method for Conditioning Molten Metal, now Patent No. 2,811,437. |
| 668,183 | 6/26/57 | Apparatus for Conditioning Material, now Patent No. 2,845,262. |

The present invention relates generally to rendering sterile a wide variety of materials which are subject to contamination and microbial deterioration, and specifically to an apparatus and method in which fluids, or solids in fluid vehicles are rendered sterile, through the oligodynamic properties of metals, particularly silver.

Bread, rolls, and cakes are substantially sterile when leaving the oven. Proper packaging may extend their shelf life over a long period, if such packaging wards off infestation by micro-organisms.

Such products as milk, and other dairy products are not sterile when produced. Pasteurization may destroy most pathogenic organisms. The lacto-bacillus remains and proliferates at a rate dependent upon temperature and time.

Juices squeezed from fruits and vegetables are likewise non-sterile. Sera, vaccines, medicaments, lotions, and numerous other materials that have an important place in a world where a high standard of living prevails are likewise non-sterile.

Where attempts have been made to use the oligodynamic action of the silver ion, for sterilization purposes, sterility has not been achieved. There are several reasons for this. In a colloidal dispersion of organic products, the organo-colloids exert a shielding action against the lethal activity of the silver ion on micro-organisms. Furthermore, the mass or bulk of the material to be rendered sterile, whether it involves an organo-colloid, or otherwise, seems to prevent the intimate dispersion of silver ions throughout the material so that the full force of their lethal activity cannot be realized.

It has been found that a decrease in the particle size of the fluid material renders aerobe and anaerobe microorganism accessible to the lethal activity of the silver ion. Inaccessibility is particularly true of materials involving organo-colloids, but the shielding action is vastly diminished if not completely eliminated, by reduction in particle size.

Since oxygen is essential in the metabolism of aerobe organisms, the present apparatus can substantially remove oxygen from the material conditioned and can also insert inert and even disinfectant gases, whereby microbial infestation may be vastly inhibited. An example of such a use would be the sterilization of water by chlorine or ozone.

Sterilizing, non-toxic gases may exert a cumulative effect with the silver ions. The additive effect of X-rays, and gamma rays may vastly enhance the sterilizing properties of the silver ions. By reason of the extremely small particle size achieved, accessibility to such radiation is vastly enhanced.

One object of my invention is to provide an apparatus and a method for the controlled introduction or removal of gases into or from alimentary materials or other materials, which materials may be applied to or be introduced into living tissues.

Another object of my invention is to provide an apparatus and method for rendering sterile alimentary materials or other materials applied to or entering living tissues.

Another object of my invention is to provide an apparatus and method for rendering nugatory the shielding effect of organo-colloids for silver ions, and the lethal effects they exert upon micro-organisms.

A still further object of my invention is to provide an apparatus and method for disposing material in particles of extremely minute size so that each particle gives ready access to silver ions, X-rays, gamma rays, sterilizing gases, and the material is rendered sterile.

To these ends, the present invention consists in providing a rotatable vessel or member, a chamber enclosing the vessel, a means for rotating the vessel, an outer wall of the vessel or member diverging in a generally outward and downward direction from the top of the vessel or member, an inner wall on the chamber similarly disposed in general opposition to the outer wall of the vessel or member.

Thus when the apparatus is utilized, and my method is practiced in my apparatus, material to be sterilized or irradiated is deposited in the vessel, or on the member, the vessel or member is rotated to discharge the material centrifigally therefrom toward the wall of the chamber and to cause it to be thrown back and forth between the inner and outer surfaces until the particle's size is vastly reduced and a mist of extremely small particles is formed. The surfaces of the member and chamber are provided with a dress of silver ion forming material, which exert oligodynamic activity on any microbial matter that may be in the material and kill it. The presence of gases in the chamber which are toxic to microbial life reinforces the lethal activity of the silver ions. The presence of means for propagating gammarays or X-rays likewise cumulates the lethal activity of the silver ions and renders the material sterile.

Figure 2:
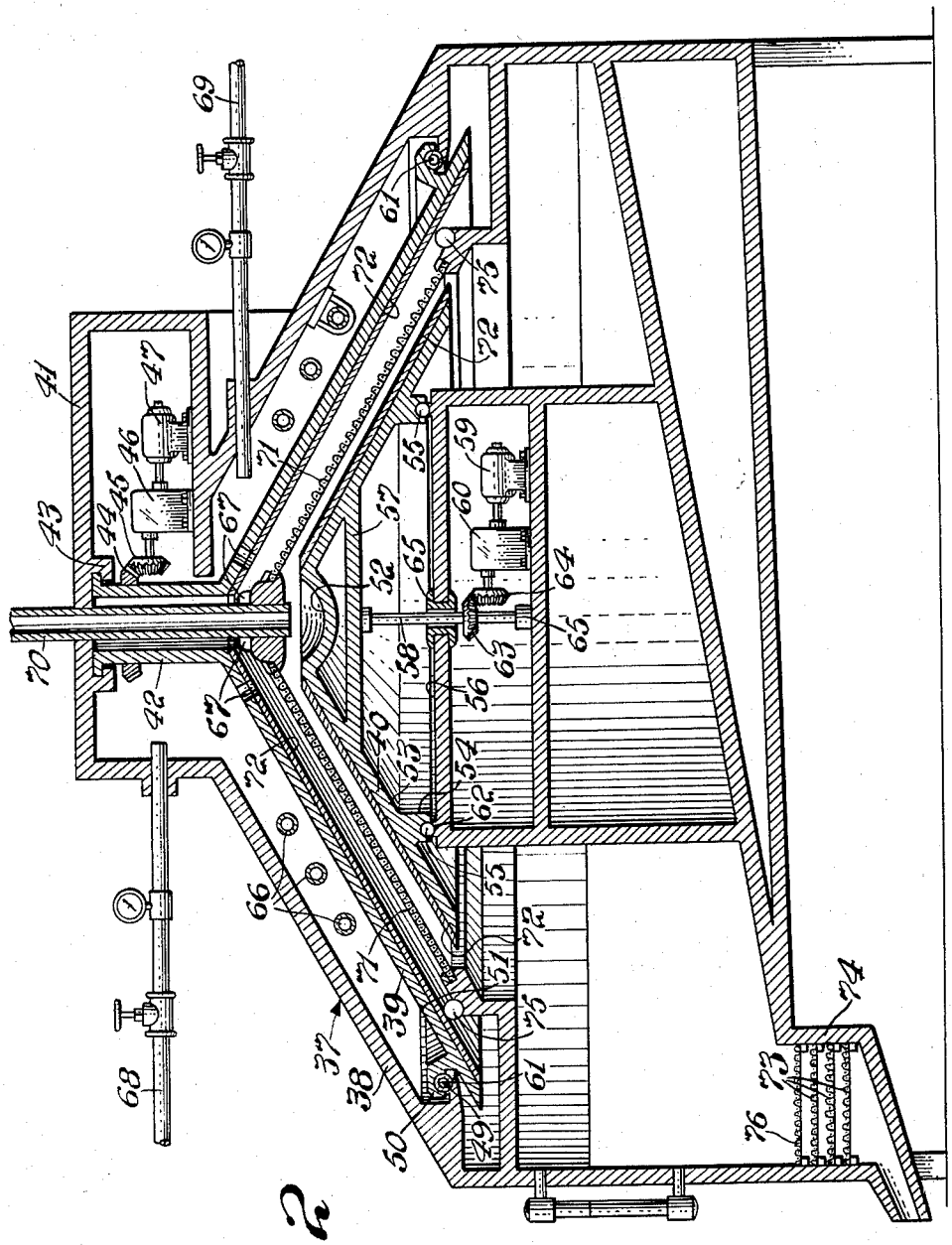

In order that the invention may be more clearly understood and readily carried into effect, the same will now be described more fully with reference to the accompanying drawings in which:

Figure 1 is a sectional elevational view of an apparatus in accordance with the practice of my method; and Figure 2 is a sectional elevational view of another apparatus in accordance with the practices of my method.

An apparatus 11, of suitable material or lined with siutable material is provided. Suitable lining materials are those which are compatible with sera, vaccines, foods in liquid state, milk, fruit juices, and the like. Suitable linings may be glass, stainless steel, or plastic coated materials. Chamber or cavity 12 is provided in the apparatus 11. A gas conduit 13 extends through the wall of the apparatus into the cavity 12. A valve 14 will control the flow of gas into the cavity 12, with a suitable pressure indicating means 15. The top of the apparatus 11 is provided with a receptacle or reservoir 16 for the reception of unconditioned material, prior to its entry into the cavity 12. This reservoir, of course, may be dispensed with and the material intended for conditioning to be introduced into the cavity 12 may be directly piped in. The reservoir 16 has an inlet 17 through which the material to be conditioned is introduced into the chamber 12. A further conduit 18 passes through the walls of the apparatus 11 to the cavity 12, and through this conduit 18 the gases of the cavity 12 may be evacuated. A valve 19 controls this conduit 18. This conduit 18 is connected to a vacuum pump.

The walls of the chamber may be provided with heating or cooling tubes 20, whereby the cavity may be maintained at a chosen temperature, for example, in the process of pasteurization, so that the destruction of microbial life may be effected by heat, as well as by silver ions. Or the temperature may be controlled in the chamber so as to maintain the material deposited therein in liquid phase, either by maintaining the temperature at a suitably high or a suitably low level.

Beneath the apparatus 11, or in a suitable compartment therein, an electric motor 21 with suitable speed changing means 22 is connected by a bevel gear 23 to a second bevel gear 24 mounted on the vertical shaft 25. The shaft is supported on a bearing 26 and passes through a substantially airtight bushing 27 into the cavity 12. Mounted on the end of the shaft 25 is a platform or support 28 which upholds a vessel 29 of (or lined with) suitable material which is compatible with the material deposited therein for conditioning.

Disposed at the base of the vessel 29, there is an annular pit 30 to receive all of the material which gravitationally would fall to the bottom of the cavity 12. An outlet 31 conducts the collected material from the pit. The outside wall 32 of the vessel 29, diverges outwardly and downwardly from the top of the vessel to the base of the vessel. It is preferred that the base angle formed by the bottom of the vessel with the side wall should be approximately 15 to 30 degrees from the horizontal. This provides a long, gradual slope from the top of the vessel to the bottom from which material may be repeatedly propelled centrifugally into more or less violent contact with the inner wall of the chamber 12. Likewise, material flowing thinly up the inner wall 34 of the vessel 29 will have a long and relatively large area on the outer wall 32 of the vessel to flow over or rebound from. This enhances the receptivity of the material to conditioning. The receptivity for conditioning is enhanced to a degree, either if the material only flows thinly over the side wall, or if it is violently propelled and atomized by contact with the inner wall of the chamber. But the greatest conditioning results from atomization through violent contact. A depression 33 in the top of the vessel 29 receives the material which enters through the inlet 17. However, as will be seen, the depression 33 may be dispensed with and the material deposited on the external surface of the vessel 29 from which it will be violently propelled or discharged by virtue of centrifugal force exerted upon it.

The wall 34 of this depression diverges upwardly and outwardly as it progresses from the bottom of the depression 33 toward the top of the vessel. This depression 33 may be very shallow or quite ample in depth.

The side wall 35 of the chamber is preferably disposed in substantial angular conformity with the side wall 32 of the vessel 29, although certain irregularities in the surface above the side wall 32 of the vessel 29 and the side wall 35 of the cavity 12 are possible and may actually enhance the atomization of the material. The substantial angular conformity (with some deviation) of these walls 32, 35, however, is calculated to induce a back and forth bounding and rebounding of material until the particles or the drops become extremely small droplets and until a high degree of atomization takes place, ultimately resulting in the formation of a mist.

The surfaces 33 and 35 are coated or dressed with an oligodynamic metal, preferably silver or a silver compound. This dress 36 may be activated by chemical means or by electrolysis.

For example, a thin film of silver may be sprayed on the surface while molten, or may be deposited there by known methods of electrodeposition. The silver dress may then be activated by washing it with a mild solution of hydrogen peroxide, or by subjecting the opposing silvered surfaces to a pulsating direct electric current while the apparatus is in operation. This pulsating direct current is created by superimposing upon an alternating current a direct current while periodically reversing the polarity of the anodic and cathodic surfaces. Another method would be to periodically reverse the polarity of a direct current applied to the opposed silver dresses, or by superimposing a direct current on an alternating current and periodically changing the polarity of the direct current. The exact method of creating silver ions is well known, is a matter of choice, and is not a part of my invention, for there are numerous equivalent ways of accomplishing my purpose.

The operation of this apparatus and the practice of the method for inhibiting microbial deterioration by rendering materials sterile may proceed as follows:

The material to be sterilized or conditioned against microbial deterioration is deposited in the receptacle 16. It flows through the inlet 17, after the removal of a plug, and falls into the cavity 33 in the vessel 29; or if the vessel is not provided with a cavity, it falls upon the external surface 32, which is provided with the oligodynamic dress 36. The vessel 29 will then be rotating at a high rate of speed and the material will be flung out of the concavity 33, or off the side wall 32. The material will fly into violent contact with the oligodynamic dress 36 on the inner wall 35 of the chamber 11. It will violently bound and rebound against that wall and from the side 32 of the vessel 29. In rebounding, I refer to the reversal of, or change in, the direction of movement of the material after contact with either the dress 36 on the inside of the chamber or the dress 36 on the outside wall of the vessel in turn, whether brought about simply by rebounding or by ricocheting or by those actions as modified by the action of gravitational or centrifugal force. The material will ultimately accumulate in the pit 30 due to gravity, and will flow out the outlet 31. A suitable gas, ozone for example, may be introduced through the conduit 13, and the pressure maintained at the desired level. In addition to the gas having a sterilizing quality, an inert gas may be similarly introduced. The proper rate of introduction of gas in order to produce the optimum result may be determined by an analysis of samples taken from the outlet 31 as well as other determinations to discover the best conditions. When such a figure is known, the identical result may be consistently reproduced.

On the other hand, if instead of introducing gases into the cavity 12 through the conduit 13, the gases of the cavity are exhausted through the conduit 18, the atomized material will readily give up its gaseous content; if such gaseous content is oxygen upon which many aerobe forms of microbial life are dependent for their existence, the degassed material will be reinforced in its resistance to microbial deterioration.

Material may likewise be conditioned, to a lesser degree, without atomizing it by regulating the speed of the vessel 29 so as to just centrifugally spin the material up the walls 34 and flow the material down the wall 32.

The outside wall of the revolving vessel can have the shape of steps, ridges or channels, as well as numerous other configurations. If such variant designs are used, shape and inclination of the inside wall of the chamber should be so chosen as to be in corresponding or at least suitable conformity in order to induce the maximum rebounding action.

The equatorial line A—B in Figure 1 indicates the point at which the apparatus may be divided into two parts for convenience, disassembly, cleaning, etc.

Assuming the outside top diameter of the rotating vessel is two feet three inches and the outside bottom diameter is seven feet, the circumference at the top is 7.0886 feet and the circumference at the bottom outside is 21.9911 feet. When the vessel rotates at 600 revolutions per minute, the circumferential velocity of the top is 70.68 feet per second and the circumferential velocity of the bottom outside is 219.90 feet per second. The centrifugal force acting upon the material increases as it progressively rebounds from the top to the bottom in proportion to the increased circumferential velocity. With each rebounding, therefore, the atomizing action increases, thereby reducing the size of the liquid particles more and more.

At the top, the material is thrown in ribbons and large globules against the wall of the chamber. Thereafter, the particle size decreases as the material rebounds progressively towards the bottom.

The extremely small droplets constituting the mist make any microbial life present much more susceptible to oligodynamic action. The same is true as to susceptibility to X-rays, gamma rays, and gases having sterilizing propreties. The extremely small particle size also facilitates the removal of gases which might help to sustain aerobe microbial life.

While I have referred to an angular inclination of the outer wall 32 of the vessel 29 at 15 to 30 degrees, it is not to be understood that this angular inclination is critical, for the angle could probably be reduced to less than 15 degrees or increased beyond 30 degrees. However, the inclination of the outer wall 32 to provide a substantially long slope for the rebounding of material from the wall 35 is one of the principal features of my invention.

In the centrifuging of liquids or liquids serving as a vehicle for solids, the atomization of the liquid by other methods and apparatus, if any, would be incomplete and transitory because the globules produced would almost instantaneously fall into a pit and coalesce into a large volume before any substantial amount of conditioning resulted. In my conditioning procedure, and apparatus, the rapid, direct depositing of a liquid into the pit is avoided and, at appropriately high rates of speed, the atomized liquid, as well as the large globules and ribbons of liquid, will be thrown against the inside wall of the chamber to rebound against the outside wall of the vessel repeatedly so that with each rebound, increasingly greater atomization is achieved, ultimately resulting in the formation of a liquid mist. The frequency of rebound is the function of the speed of the vessel 29, the angular inclination and length of the walls 32, 35, and the distance between the walls.

Attention is directed to the fact that the receptacle 16 is merely a matter of convenience which may be used for accumulating material for conditioning; but the receptacle may be dispensed with and the material piped directly into the chamber 12.

It is further noted that the chamber 12 is referred to as having a rotatable vessel 29 disposed therein. While the presence of the depression 33 at the top of the vessel 29 to receive material prior to discharging it is desiraable in order to insure the discharge of the material at a high velocity, it will be apparent that material deposited on the external surface of a rotating member with only a slight depression 33, or indeed a member having no depression whatsoever, will tend to be centrifugally discharged from its surface. Such discharge, however, is enhanced as to its velocity by utilizing the depression 33.

*Definitions*

"Rebounding" refers to the contact of material against either the inside wall of the chamber or the outside wall of the vessel, and the sprnigback therefrom, whether by reason of the resilience of the material, or the walls; part of the springback from the outside of the vessel or the inside of the chamber may be governed by gravity; likewise springback from the outside wall of the vessel may be the result of the material or the wall being resilient or it may be the result of spinoff from the revolving vessel or a combination of several of these factors. "Rebounding" includes all springback regardless of the cause.

"Conditioning" is intended to refer to the sterilization of liquids, or liquids embodying solids, whether (1) by rendering the liquids susceptible to oligodynamic activity of silver or other metals, or (2) to the sterilizing quality of gases, or (3) of the removal of gases from the liquid, or (4) of the addition of an inert or non-inert gas to the liquid, or (5) irradiation, or (6) combination of the foregoing. The principle conditioning, however, referred to herein is the conditioning resulting from the exposure of the material to the oligodynamic property of the dress upon the walls 32, 35. "Conditioning" comprises these steps and results.

An example of an apparatus specifically designed to sterilize milk, fruit juices, vaccines and other liquids containing a high percentage of organo-colloids is shown in Figure 2. This apparatus will also be satisfactory for sterilizing large quantities of water to render it suitable for drinking purposes. The apparatus 37 comprises an outer metal shell 38 enclosing a spinner 39 and a vessel 40. The spinner 39 is a hollow core suspended from the top of a motor box 41 by the hollow shaft 42. This hollow shaft 42 rotates in a suspension bushing 43. The bevel gears 44, 45 connect the hollow shaft 42 with the speed changing means 46 and an electric motor 47.

The shell 38 is inclined and is provided at its lower extremity with annular ball-race 49. A rider 50 is attached to the outer wall 51 of the spinner 39 and a plurality of other riders 50 travel on balls 61 in the race 49. Thus, the race 49 supports the spinner 39 for rotation.

The vessel 40 is provided witht either a cavity 52 at its top, or the top can be flat, or even come to a peak. The inside wall 53 of the vessel 40 is provided with a ring 54 which revolves on balls 55 in a race 62 on the top of the motor box 56. The vessel 40 is attached to a plate 57 to which the drive shaft 58 is secured. The electric motor 59 operates the speed changing means 60 located in the motor box 56 and the speed changing means drives the shaft 56 through the bevel gears 63, 64. The shaft may be supported by the bearing 65 and passes through the top plate of the motor box 56 through an airtight bushing 65.

The spinner 39 and vessel 40 may rotate either in the same direction or in opposite directions.

In the space between the spinner 39 and the wall 38 there may be located coils 66 for heating and cooling during the conditioning operation. The walls of the spinner 39 may be provided wtih holes 67 so that the area between the spinner and the vessel exchanges its atmosphere with other parts of the enclosure. Pipes 68 and 69 may permit the introduction or removal of gases and vapors during the conditioning operation.

In this form of device, the liquid to be conditioned by being rendered sterile may enter the apparatus through the pipe 70 which passes through the hollow shaft 42. During the conditioning by the bounding and rebounding of the liquid, it is dispersed into extremely small particles, ultimately to form a mist in the chamber. The inner surface of the spinner 39 and the outer surface of the vessel 40 are provided with a dress 72 of oligodynamic materials, preferably silver or silver compounds and the lethal metal ions destroy microbial life. A silver screen 71 may be suspended between the spinner 39 and vessel 40 and this screen 71 may be one electrode in combination with the electrodes formed by the oligodynamic metal dress 72 on the spinner 39 and vessel 40. This oligodynamic dress 72 may be formed as hereinbefore set forth. Silver screens 73 may be provided in the outlet sump 74. These screens may be cathodes except that the top one may be the anode 76 whereby the traces of silver in the conditioned material are electrolytically removed. An X-ray tube or a radiation capsule 75 may be disposed in the apparatus so that the sterilizing effect may be further realized. Several batteries of apparatus may be disposed in cascade to cumulatively enhance the sterilizing effect of each preceding apparatus. Traces of silver can also be removed by ion-exchangers, sequestration, and other means.

While I have referred to in the specification and illustrated in the drawings, an oligodynamic dress on the inner surface of the chamber, on the outer surface of the vessel, on the inner surface of the spinner, and on the outer surface of the revolving member, it is to be understood that such dress may be extended to the interior of the vessel and to any other surfaces or areas with which the material to be conditioned may come in contact.

I have described my apparatus and method for conditioning liquids as well as liquids serving as a vehicle for solids and it is to be understood that the apparatus may be used for conditioning such materials with or without gaseous inclusions or of a highly homogeneous character. It should be further noted that various applications may be made and the nature of the gaseous material which is introduced into the material and changes of the precise form of the apparatus may likewise be made, all within the scope of the claims, without departing from the spirit of the invention. The precise method of introducing gas into the chamber is no part of my invention, since the gases may be introduced therein by introducing gas generating liquids or solids into the chamber. It may be understood from the foregoing description that the term conditioning is used herein for establishing a condition of sterility in the material treated or the introduction or removal of gas from such material, regardless of whether such treatment is for the purpose of producing physical or chemical changes in the material or both.

The foregoing description is merely intended to illustrate an embodiment of the invention. The component parts of the apparatus and the steps in the method have been shown and described. They each may have substitutes which may perform a substantially similar function; such substitutes may be known as proper substitutes for said components and steps and may have actually been known or invented before the present invention; these substitutes are contemplated as being within the scope of the appended claims, although they are not specifically catalogued herein.

I claim:

1. A method for sterilizing material comprising depositing material on a member having portions of its outer surface extending in a generally outward and downward direction, rotating the member in a chamber having portions of its inner surface similarly extending in a generally outward and downward direction, continuing such rotation of the member to discharge the material centrifugally therefrom and to cause it to be thrown back and forth between said outer and inner surfaces, at least one of which has an oligodynamic dress.

2. A method for sterilizing material comprising depositing material in a member having portions of its outer surface extending in a generally outward and downward direction, rotating the member in a chamber having portions of its inner surface similarly extending in a generally outward and downward direction, continuing such rotation of the member to discharge the material centrifugally therefrom and to cause it to be drawn back and forth between said outer and inner surfaces, at least one of which has an oligodynamic dress, until the material is substantially atomized and a mist is formed.

3. A method for sterilizing material comprising depositing material on a member having portions of its outer surface extending in a generally outward and downward direction, rotating the member in a chamber having portions of its inner surface similarly extending in a generally outward and downward direction, continuing such rotation of the member to discharge the material centrifugally therefrom and to cause it to be thrown back and forth between said outer and inner surfaces at least one of which has an oligodynamic dress and introducing a gas into the chamber.

4. A method for sterilizing material comprising depositing material on a member having portions of its outer surface extending in a generally outward and downward direction, rotating the member in a chamber having portions of its inner surface similarly extending in a generally outward and downward direction, continuing such rotation of the member to discharge the material centrifugally therefrom and to cause it to be thrown back and forth between said outer and inner surfaces, at least one of which has an oligodynamic dress, and introducing controlled volumes of gas into the chamber.

5. A method for sterilizing material comprising depositing material on a member having portions of its outer surface extending in a generally outward and downward direction, rotating the member in a chamber having portions of its inner surface similarly extending in a generally outward and downward direction, continuing such rotation of the member to discharge the material centrifugally therefrom and to cause it to be thrown back and forth between said outer and inner surfaces, at least one of which has an oligodynamic dress, and introducing ozone into the chamber.

6. A method for sterilizing material comprising depositing material on a member having portions of its outer surface extending in a generally outward and downward direction, rotating the member in a chamber having portions of its inner surface similarly extending in a generally outward and downward direction, continuing such rotation of the member to discharge the material centrifugally therefrom and to cause it to be thrown back and forth between said outer and inner surfaces, at least one of which has an oligodynamic dress, and introducing an inert gas into the chamber.

7. A method for sterilizing material comprising depositing material on a member having portions of its outer surface extending in a generally outward and downward direction, rotating the member in a chamber having portions of its inner surface similarly extending in a generally outward and downward direction, continuing such rotation of the member to discharge the material centrifugally therefrom and to cause it to be thrown back and forth between said outer and inner surfaces, at least one of which has an oligodynamic dress, and introducing gas forming matter into the chamber.

8. A method for sterilizing material comprising depositing material on a member having portions of its outer surface extending in a generally outward and downward direction, rotating the member in a chamber having portions of its inner surface similarly extending in a generally outward and downward direction, continuing such rotation of the member to discharge the material centrifugally therefrom and to cause it to be thrown back and forth between said outer and inner surfaces, at least one of which has an oligodynamic dress, and exhausting the atmosphere from the chamber.

9. A method for sterilizing material comprising depositing material in a vessel having portions of its outer surface extending in a generally outward and downward direction, rotating the vessel in a chamber having portions of its inner surface similarly extending in a generally outward and downward direction, continuing such rotation of the vessel to discharge the material centrifugally therefrom and to cause it to be thrown back and forth between said outer and inner surfaces, at least one of which has an oligodynamic dress.

10. A method for sterilizing fluids comprising depositing a fluid on a member having portions of its outer surface extending in a generally outward and downward direction, rotating the member in a chamber having portions of its inner surface similarly extending in a generally outward and downward direction, continuing such rotation of the member to discharge the material centrifugally therefrom and to cause it to be thrown back and forth between said outer and inner surfaces, at least one of which has an oligodynamic dress.

11. A method for sterilizing solid material in a fluid vehicle comprising depositing a solid material in a fluid vehicle in a member having portions of its outer surface extending in a generally outward and downward direction, rotating the member in a chamber having portions of its inner surface similarly extending in a generally outward and downward direction, continuing such rotation of the member to discharge the solid material in the fluid vehicle centrifugally therefrom and to cause it to be thrown back and forth between said outer and inner surfaces, at least one of which has an oligodynamic dress.

12. A method for sterilizing material comprising depositing material on a member having portions of its outer surface extending in a generally outward and downward direction, rotating the member in a chamber having a second rotatable member with portions of its inner surface similarly extending in a generally outward and downward direction, rotating the second member, continuing such rotation of the members to discharge the material centrifugally therefrom and to cause it to be thrown back and forth between said outer and inner surfaces, at least one of which has an oligodynamic dress.

13. A method for sterilizing material comprising depositing material on a member having portions of its outer surface extending in a generally outward and downward direction, rotating the member in a chamber having a second rotatable member with portions of its inner surface similarly extending in a generally outward and downward direction, rotating the second member, continuing such rotation of the members to discharge the material centrifugally therefrom and to cause it to be thrown back and forth between said outer and inner surfaces, at least one of which has an oligodynamic dress, until the material is substantially atomized and a mist is formed.

14. A method for sterilizing material comprising depositing material on a member having portions of its outer surface extending in a generally outward and downward direction, rotating the member in a chamber having a second rotatable member with portions of its inner surface similarly extending in a generally outward and downward direction, rotating the second member continuing such rotation of the members to discharge the material centrifugally therefrom and to cause it to be thrown back and forth between said outer and inner surfaces, at least one of which has an oligodynamic dress and interposing a pervious oligodynamic screen between the outer and inner surfaces.

15. A method for sterilizing material comprising depositing material on a member having portions of its outer surface extending in a generally outward and downward direction, rotating the member in a chamber having a second rotatable member with portions of its inner surface similarly extending in a generally outward and downward direction, continuing such rotation of the members to discharge the material centrifugally therefrom and to cause it to be thrown back and forth between said outer and inner surfaces, at least one of which has an oligodynamic dress, and generating sterilizing rays in the chamber.

16. A method for sterilizing material comprising depositing material in a vessel having portions of its outer surface extending in a generally outward and downward direction, rotating the vessel in a chamber having a rotatable member with portions of its inner surface similarly extending in a generally outward and downward direction rotating the rotatable member continuing such rotation of the vessel and member to discharge the material centrifugally therefrom and to cause it to be thrown back and forth between said outer and inner surfaces, at least one of which has an oligodynamic dress.

17. A method for sterilizing material comprising depositing material on a member having portions of its outer surface extending in a generally outward and downward direction, rotating the member in a chamber having a rotatable member with portions of its inner surface similarly extending in a generally outward and downward direction, rotating the rotatable member continuing such rotation of the members to discharge the material centrifugally therefrom and to cause it to be thrown back and forth between said outer and inner surfaces, at least one of which has an oligodynamic dress, and controlling the gaseous atmosphere of the chamber.

References Cited in the file of this patent

UNITED STATES PATENTS

| | | |
|---|---|---|
| 2,086,324 | Feremutsch | July 6, 1937 |
| 2,109,151 | Krause | Feb. 22, 1938 |
| 2,356,505 | Christensen | Aug. 22, 1944 |
| 2,518,081 | Sharaf | Aug. 8, 1950 |
| 2,756,470 | Sawchuk | July 31, 1956 |